United States Patent
Gu

(10) Patent No.: US 10,459,309 B2
(45) Date of Patent: Oct. 29, 2019

(54) ELECTRONIC PAPER AND MANUFACTURING METHOD THEREOF

(71) Applicant: BOE TECHNOLOGY GROUP CO., LTD., Beijing (CN)

(72) Inventor: Xin Gu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 8 days.

(21) Appl. No.: 15/717,603

(22) Filed: Sep. 27, 2017

(65) Prior Publication Data

US 2018/0088433 A1    Mar. 29, 2018

(30) Foreign Application Priority Data

Sep. 29, 2016    (CN) .......................... 2016 1 0866292

(51) Int. Cl.
     *G02F 1/167*      (2019.01)
     *G02B 26/02*      (2006.01)
     (Continued)

(52) U.S. Cl.
     CPC ........... *G02F 1/167* (2013.01); *G02B 26/026* (2013.01); *G02F 1/133553* (2013.01);
     (Continued)

(58) Field of Classification Search
     CPC .......... G02F 1/03; G02F 1/07; G02F 1/13306; G02F 1/133377; G02F 1/133553;
     (Continued)

(56) References Cited

U.S. PATENT DOCUMENTS 6,215,920 B1    4/2001    Whitehead et al.
6,753,999 B2 *    6/2004    Zehner .................. B41J 3/4076
                                                   204/450

(Continued)

FOREIGN PATENT DOCUMENTS

CN      2000171813 A      6/2000
CN      1639625 A      7/2005
     (Continued)

OTHER PUBLICATIONS

Chinese office action dated Jul. 16, 2018 for corresponding application No. 201610866292.6 with English translation attached.

*Primary Examiner* — Bumsuk Won
*Assistant Examiner* — Loha Ben
(74) *Attorney, Agent, or Firm* — Nath, Goldberg & Meyer; Joshua B. Goldberg

(57) ABSTRACT

An electronic paper and a manufacturing method thereof are provided. The electronic paper includes a first substrate provided with a microstructure and multiple first electrodes thereon; a second substrate arranged opposite to the first substrate and provided with multiple second electrodes thereon, the microstructure is arranged on a side of the first substrate facing the second substrate; and pixel isolation walls arranged between the first and second substrates, for dividing the electronic paper into pixel units; each pixel unit includes: one first substrate; one second substrate; charged particles arranged between the first and second electrodes, the first and second electrodes control, depending on a voltage applied thereto, contact between the charged particles and the microstructure; when the charged particles are not in contact with the microstructure, light from outside is subject to total internal reflection after being radiated to the microstructure through the first substrate.

15 Claims, 5 Drawing Sheets

(51) Int. Cl.
*G09G 3/34* (2006.01)
*G02F 1/1335* (2006.01)
*G02F 1/1343* (2006.01)
*G02B 26/00* (2006.01)

(52) U.S. Cl.
CPC ....... G02F 1/134309 (2013.01); G09G 3/344 (2013.01); *G02B 26/007* (2013.01); *G02B 26/02* (2013.01); *G02F 2203/023* (2013.01); *G09G 3/34* (2013.01); *G09G 2320/0626* (2013.01)

(58) Field of Classification Search
CPC ........... G02F 1/134309; G02F 1/13439; G02F 1/1362; G02F 1/157; G02F 1/167; G02F 1/172; G02F 2001/133562; G02F 2001/1676; G02F 2001/1678; G02F 2203/02; G02F 2203/023; G02F 2203/055; G09G 3/34; G09G 3/3433; G09G 3/344; G09G 3/3446; G09G 3/3453; G09G 2320/06; G09G 2320/0626; G09G 2320/066; G02B 26/00; G02B 26/007; G02B 26/02; G02B 26/026; G02B 27/10

USPC ....... 359/228, 252, 253, 296, 452, 453, 619; 345/84, 107, 211, 212, 214, 698
See application file for complete search history.

(56) References Cited

U.S. PATENT DOCUMENTS

| | | | |
|---|---|---|---|
| 7,057,599 B2* | 6/2006 | Engler | G02B 26/026 345/107 |
| 2007/0263291 A1 | 11/2007 | Whitehead | |
| 2018/0031941 A1* | 2/2018 | Goulding | G02F 1/167 |
| 2018/0088429 A1* | 3/2018 | Gu | G02F 1/157 |
| 2018/0088434 A1* | 3/2018 | Liang | G02F 1/1362 |
| 2018/0088435 A1* | 3/2018 | Liang | G02F 1/167 |

FOREIGN PATENT DOCUMENTS

| | | |
|---|---|---|
| CN | 1820223 A | 8/2006 |
| CN | 101160547 A | 4/2008 |
| CN | 105940344 A | 9/2016 |

* cited by examiner

ELECTRONIC PAPER AND MANUFACTURING METHOD THEREOF

CROSS REFERENCE TO RELATED APPLICATION

The present application claims priority to the application No. 201610866292.6, entitled "Electronic Paper and Manufacturing Method Thereof", filed on Sep. 29, 2016, which is hereby incorporated by reference in its entirety.

FIELD OF THE INVENTION

The present disclosure relates to the field of display technology, and in particular, relates to electronic paper and a manufacturing method thereof.

BACKGROUND OF THE INVENTION

Electronic paper is a novel electronic display device. Electronic paper products at present are generally manufactured by using cholesteric liquid crystal display technology, electrophoresis display technology (IED), electrowetting display technology or the like. The most promising technological approach is electrophoresis display technology, the most applied medium of which is E-ink.

Electrophoresis (EP) is a phenomenon that charged particles move, under the effect of an electric field, toward an oppositely charged electrode. A display panel manufactured by using electrophoresis is an electrophoresis display panel.

SUMMARY OF THE INVENTION

The present disclosure is intended to at least solve one of the technical problems in the prior art, and provide electronic paper with high reflectivity and a manufacturing method thereof.

A technical solution adopted in the present disclosure to solve the technical problem is electronic paper, including:

a first substrate provided with a microstructure and a plurality of first electrodes thereon;

a second substrate arranged opposite to the first substrate and provided with a plurality of second electrodes thereon, wherein the microstructure is arranged on a side of the first substrate facing the second substrate; and pixel isolation walls arranged between the first substrate and the second substrate, for dividing the electronic paper into a plurality of pixel units;

wherein each pixel unit includes:

one first electrode;

one second electrode; and charged particles arranged between the first electrode and the second electrode, wherein the first electrode and the second electrode control, depending on a voltage applied thereto, contact between the charged particles and the microstructure; and when the charged particles are not in contact with the microstructure, light from outside is subject to total internal reflection after being radiated to the microstructure through the first substrate.

Optionally, the plurality of first electrodes are arranged on the side of the first substrate facing the second substrate; and the plurality of second electrodes are arranged on a side of the second substrate facing the first substrate.

Optionally, the plurality of first electrodes are located between the first substrate and a layer where the microstructure is located.

Optionally, the first electrodes are located on a side of the microstructure facing the second substrate.

Optionally, the first electrodes have a uniform thickness.

Optionally, a refractive index of a material of the microstructure is greater than 1.7.

Optionally, a shape of the microstructure includes any of a hemisphere, a quadrangular pyramid and a circular cone.

Optionally, the charged particles are ink particles.

Optionally, the plurality of first electrodes are connected together to form a plate electrode.

Optionally, the plurality of second electrodes are connected together to form a plate electrode.

A technical solution adopted in the present disclosure to solve the technical problem is a manufacturing method of electronic paper, including:

forming a plurality of first electrodes on a first substrate;

forming a plurality of second electrodes on a second substrate;

forming pixel isolation walls between the first substrate and the second substrate;

providing charged particles between the first substrate and the second substrate; and performing cell alignment on the first substrate and the second substrate, wherein the pixel isolation walls divide the electronic paper into a plurality of pixel units; each pixel unit includes one first electrode, one second electrode, and charged particles arranged between the first electrode and the second electrode, wherein the manufacturing method of electronic paper further includes:

forming a microstructure on a side of the first substrate facing the second substrate; wherein the first electrode and the second electrode in each of the pixel units control, depending on a voltage applied thereto, contact between the charged particles and the microstructure; and when the charged particles are not in contact with the microstructure, light from outside is subject to total internal reflection after being radiated to the microstructure through the first substrate.

Optionally, the step of forming the microstructure on the first substrate further includes:

coating the first substrate with a transparent material; and forming the microstructure by nanoimprint process.

Optionally, the thickness of the coated transparent material ranges from about 10 μm to about 50 μm.

Optionally, the step of providing the charged particles between the first substrate and the second substrate further includes:

dispersing the charged particles into a solvent to form a mixture, and filling the mixture into a space between the first substrate and the second substrate by instillation; and volatilizing the solvent, and introducing a gas.

Optionally, the gas is air or an inert gas.

Optionally, the step of forming the plurality of first electrodes on the first substrate further includes:

forming the plurality of first electrodes on a surface of a side of the first substrate facing the second substrate, and the step of forming the microstructure on the side of the first substrate facing the second substrate further includes:

forming the microstructure on a side of the plurality of first electrodes facing the second substrate.

Optionally, the step of forming the microstructure on the side of the first substrate facing the second substrate further includes:

forming the microstructure on a surface of a side of the plurality of first electrodes facing the second substrate, and the step of forming the plurality of first electrodes on the first substrate further includes:

forming the plurality of first electrodes on a side of the microstructure facing the second substrate.

Optionally, the step of forming the plurality of first electrodes on the side of the microstructure facing the second substrate further includes:

forming the plurality of first electrodes into a uniform thickness.

Optionally, the step of forming the plurality of first electrodes on the first substrate further includes:

forming the plurality of first electrodes into an integral plate electrode.

Optionally, the step of forming the plurality of second electrodes on the second substrate further includes:

forming the plurality of second electrodes into an integral plate electrode.

Figure 1:
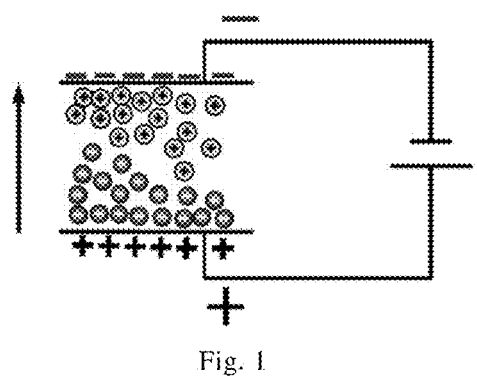
FIG. 1 is a schematic diagram of the operating principle of electronic paper according to the present disclosure.

Reference numerals: 10—first substrate; 20—second substrate; 30—charged particle; 40—pixel isolation wall; 11—first electrode; 12—microstructure; 21—second electrode.

DETAILED DESCRIPTION OF THE EMBODIMENTS

To make the person skilled in the art better understand the technical solution of the present disclosure, the present disclosure is further described below in detail in conjunction with the accompanying drawings and the specific embodiments.

The operating principle of electronic paper is as follows: as shown in FIG. 1, the electronic paper using electrophoresis to achieve the effect of display contrast includes an upper substrate and a lower substrate with a number of microcapsules arranged therebetween (the diameter of the microcapsules is in the micron order), wherein each microcapsule contains therein a number of charged black particles and charged white particles; polarities of charges of the black particles and the white particles being opposite (+ and − respectively), and the black particles and the white particles moving up and down between the upper substrate and the lower substrate, under the effect of an electric field applied thereto. Thus, once a certain voltage is applied properly to the microcapsules, the charged particles can be caused to move to generate different combinations of white and black particles, eventually achieving graphic and textual display. The present disclosure provides novel electronic paper and a manufacturing method thereof.

Embodiment 1:

As shown in FIGS. 2-7, the present embodiment provides electronic paper including a first substrate 10 and a second substrate 20 arranged oppositely; and pixel isolation walls 40 arranged between the first substrate 10 and the second substrate 20; the pixel isolation walls 40 divide the electronic paper into a plurality of pixel units; each pixel unit includes a first electrode 11 arranged on the first substrate 10, a second electrode 21 arranged on the second substrate, and charged particles 30 arranged between the first electrode 11 and the second electrode 21. The electronic paper in this embodiment further includes a microstructure 12 arranged on a side of the first substrate 10 facing the second substrate 20, and the microstructure 12 is made of a material with a refractive index greater than that of the air medium. A voltage applied to the first electrode 11 and the second electrode 21 in each pixel unit is controlled to control whether the charged particles 30 come into contact with the microstructure 12; and when the charged particles 30 are not in contact with the microstructure 12, light from outside can be subject to total internal reflection after being radiated to the microstructure 12.

In this embodiment, an electric field generated between the first electrode 11 and the second electrode 21 by applying a voltage thereto can drive the charged particles to move to the microstructure 12, and can also drive the charged particles to move away from the microstructure 12. Description is given below by using an example that the electric field between the first electrode 11 and the second electrode 21 can drive the charged particles to move to the microstructure 12.

Figure 2:
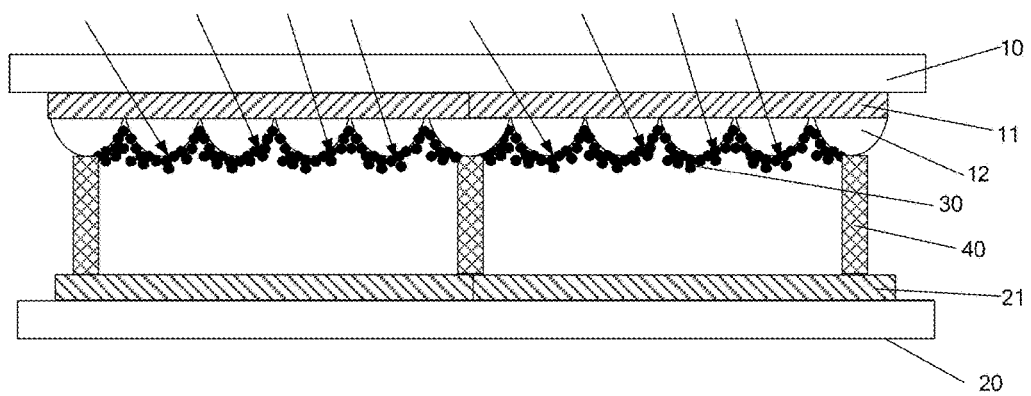
FIG. 2 is a schematic diagram of a pixel unit in a black state, of electronic paper of embodiment 1 of the present disclosure.
Figure 3:
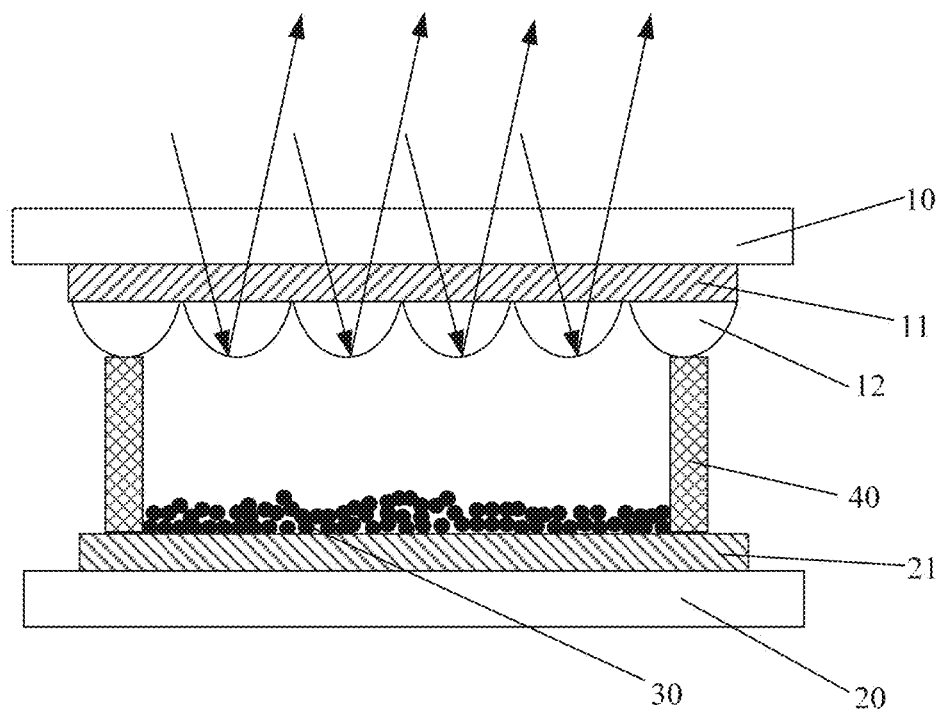
FIG. 3 is a schematic diagram of a pixel unit in a white state, of electronic paper of embodiment 1 of the present disclosure.

Specifically, for each pixel unit, after a voltage is applied to the first electrode 11 and the second electrode 21, an electric field can be generated therebetween, and in this case, the charged particles 30 in each pixel unit (preferably the charged particles 30 are black) can be driven by the electric field to move to the surface of the microstructure 12. In this case, light from outside can be absorbed by the charged particles 30, and the pixel unit comes into a black state, as shown in FIG. 2. When no voltage is applied to the first electrode 11 and the second electrode 21, the charged particles 30 can move away from the surface of the microstructure 12, and in this case, since the refractive index of the material of the microstructure is greater than that of the air medium, light from outside can be subject to total internal reflection after being radiated to the microstructure 12, so that the pixel unit comes into a white state, as shown in FIG. 3. In existing electronic paper, the white state is achieved by light scattering by white pellets. In this embodiment, the white state is achieved by total internal reflection of light resulting from the refractive index difference of a contact interface between the microstructure and air. When light is radiated from an optically thicker medium to an optically thinner medium, total reflection will occur if the incident angle is greater than a critical angle. The greater the refractive index difference between the optically thicker medium and the optically thinner medium, the smaller the critical angle, and the higher the total reflection. In this embodiment, therefore, the refractive index difference between the microstructure and air should be as large as possible to improve the reflectivity of the electronic paper.

To ensure that the first electrode 11 and the second electrode 21, after being applied the voltage to form the electric field, can well drive the charged particles 30 to move, preferably in the embodiment, the first electrode 11 is arranged on a side of the first substrate 10 facing the second substrate 20; and the second electrode 21 is arranged on a side of the second substrate 20 facing the first substrate 10. Of course, it is also possible that the first electrode 11 is arranged on a side of the first substrate 10 away from the second substrate 20; and the second electrode 21 is arranged on a side of the second substrate 20 away from the first substrate 10, as long as it can ensure formation of the electric field between the first electrode 11 and the second electrode 21 after the voltage is applied to the first electrode 11 and the second electrode 21.

In each pixel unit, the first electrode 11 may be located between the first substrate 10 and the microstructure 12, and of course may also be located on a side of the microstructure 12 facing the second substrate 20. In the case the first electrode 11 is located on the side of the microstructure 12 facing the second substrate 20, in order to ensure better contact between the charged particles 30 and the microstructure 12, the first electrode 11 is configured to be uniform in thickness, and the first electrode 11 and the microstructure 12 are in full contact; that is, the first electrode 11 is formed with a uniform thickness on the surface of the side of the microstructure 12 facing the second substrate 20. Preferably, the refractive indices of the first electrode 11 and the microstructure 12 are proximate, and more preferably, the refractive indices of the first electrode 11 and the microstructure 12 are equal.

To increase the reflectivity of light after passing through the microstructure 12, preferably the microstructure 12 is manufactured from a material with a refractive index of greater than 1.7.

Figure 5:
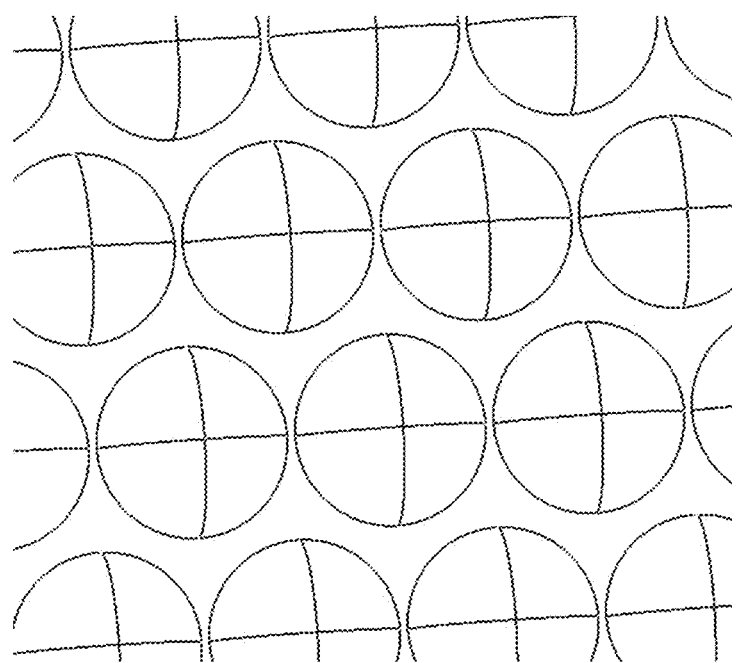
FIG. 5 is a schematic diagram of a microstructure in the shape of a hemisphere, of electronic paper of embodiment 1 of the present disclosure.
Figure 6:
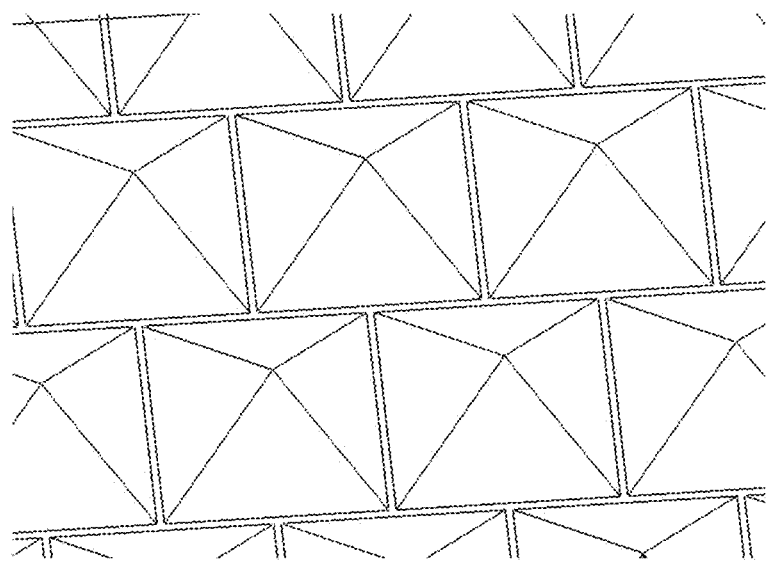
FIG. 6 is a schematic diagram of a microstructure in the shape of a quadrangular pyramid, of electronic paper of embodiment 1 of the present disclosure.
Figure 7:
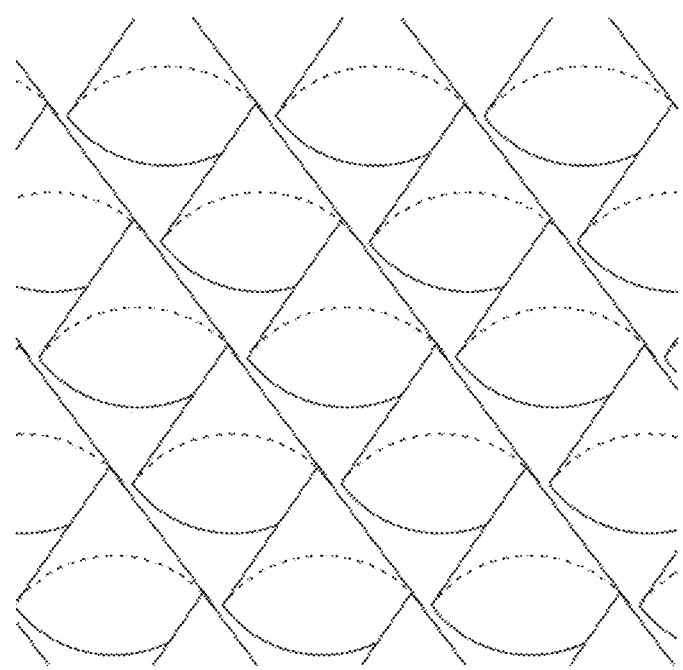
FIG. 7 is a schematic diagram of a microstructure in the shape of a circular cone, of electronic paper of embodiment 1 of the present disclosure.

Optionally, the shape of the microstructure 12 in this embodiment includes any of a hemisphere, a quadrangular pyramid and a circular cone, as shown in FIGS. 5-7.

Optionally, the charged particles in this embodiment are ink particles, more preferably black ink particles. In this case, after a voltage is applied to the first electrode 11 and the second electrode 21, an electric field can be generated therebetween, and in this case, the ink particles in each pixel unit can be driven by the electric field to move to the surface of the microstructure 12. In this case, light from outside can be absorbed by the ink particles, and the pixel unit comes into a black state. When voltage application to the first electrode 11 and the second electrode 21 is stopped, the ink particles can move away from the surface of the microstructure 12, and in this case, since the refractive index of the material of the microstructure 12 is greater that that of the air medium, light from outside can be subject to total internal reflection after being radiated to the microstructure, so that the pixel unit comes into a white state. In this way, black and white display of the electronic paper is achieved.

Optionally, the first electrodes 11 can be formed into an integral plate electrode, so that the plate electrode can serve as a common electrode, and movement of the charged particles in the pixel units is controlled by the electric fields generated between the second electrodes and the plate electrode.

Optionally, the second electrodes 21 can be formed into an integral plate electrode, so that the plate electrode can serve as a common electrode, and movement of the charged particles in the pixel units is controlled by the electric fields generated between the first electrodes and the plate electrode.

With the above configuration that the plurality of first electrodes or the plurality of second electrodes are formed into one plate electrode, the control and wiring complexity can be reduced, and the cost can also be lowered.

Embodiment 2:

This embodiment provides a manufacturing method of electronic paper, which can be used to prepare the electronic paper in embodiment 1. This manufacturing method includes a step of forming pixel isolation walls 40 between the first substrate 10 and the second substrate 20, wherein the pixel isolation walls 40 divide the electronic paper into a plurality of pixel units. The manufacturing method further includes, for each pixel unit, forming a first electrode 11 on the first substrate 10, forming a second electrode 21 on the second substrate 20, and forming charged particles 30 between the first electrode 11 and the second electrode 21. The manufacturing method of electronic paper in this embodiment further includes: forming a microstructure 12 on the first substrate 10; wherein the first electrode 11 and the second electrode 21 in each pixel unit control, depending on voltage application, whether the charged particles 30 come into contact with the microstructure 12; and when the charged particles 30 are not in contact with the microstructure 12, light from outside can be subject to total internal reflection after being radiated to the microstructure 12.

Figure 4:
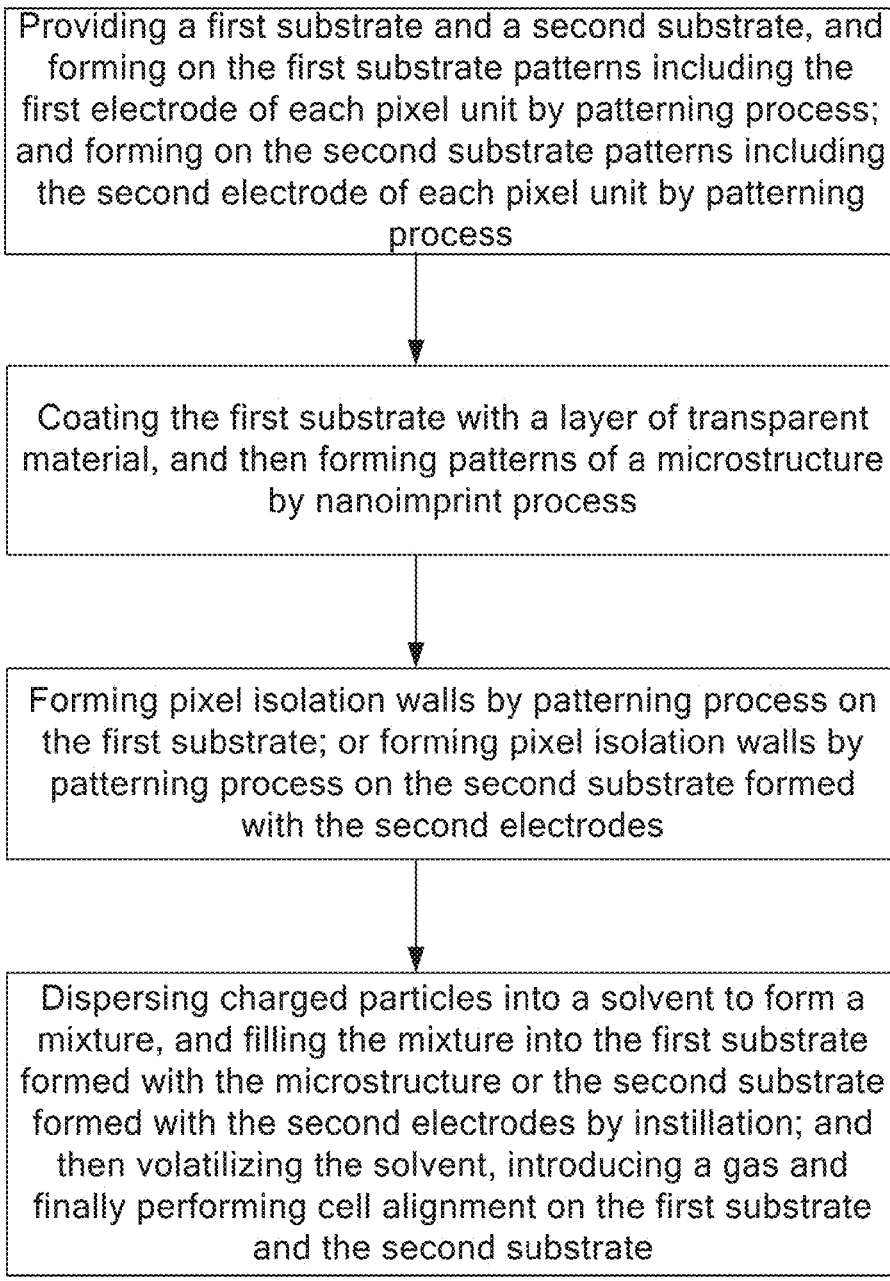
FIG. 4 is a schematic diagram of a manufacturing method of electronic paper of embodiment 1 of the present disclosure.

As shown in FIG. 4, the manufacturing process of electronic paper in this embodiment is described below in conjunction with the specific manufacturing method.

The manufacturing method of electronic paper in this embodiment includes:

step 1, providing the first substrate 10 and the second substrate 20, and forming on the first substrate 10 patterns including the first electrode 11 of each pixel unit by patterning process; and forming on the second substrate 20 patterns including the second electrode 21 of each pixel unit by patterning process;

step 2, coating the first substrate 10 after step 1 with a layer of transparent material, and then forming patterns of a microstructure 12 by nanoimprint process, wherein the thickness of the coated transparent material ranges from about 10 μm to about 50 μm and has a refractive index greater than 1.7; and the shape of the microstructure 12 includes any of a hemisphere, a quadrangular pyramid and a circular cone;

step 3, forming the pixel isolation walls 40 by patterning process on the first substrate 10 after step 2; or forming the pixel isolation walls 40 by patterning process on the second substrate 20 formed with the second electrodes 21; and step 4, dispersing the charged particles 30 into a solvent to forming a mixture, and filling the mixture into the first substrate 10 formed with the pixel isolation walls 40 or the second substrate 20 formed with the pixel isolation walls 40 by instillation; and then volatilizing the solvent, introducing a gas and finally performing cell alignment on the first substrate 10 and the second substrate 20, wherein, for example, the introduced gas has a refractive index of about 1, and may be air or an inert gas, for example.

It needs to be noted here, also possibly in this embodiment, the microstructure 12 and then the first electrode 11 are sequentially formed on the first substrate 10. Of course, it is also possible that the first electrode 11 is arranged on a surface of the first substrate 10 away from the second substrate 20; and the second electrode 21 is arranged on a surface of the second substrate 20 away from the first substrate 10, as long as it can ensure formation of an electric field between the first electrode and the second electrode after a voltage is applied to the first electrode 11 and the second electrode 21.

Optionally, the plurality of first electrodes 11 can be formed into an integral plate electrode, so that the plate electrode can serve as a common electrode, and movement of the charged particles in the pixel units is controlled by the electric fields generated between the second electrodes 21 and the plate electrode.

Optionally, the plurality of second electrodes 21 can be formed into an integral plate electrode, so that the plate electrode can serve as a common electrode, and movement of the charged particles in the pixel units is controlled by the electric fields generated between the first electrodes 11 and the plate electrode.

The present disclosure has the following beneficial effects:

In the electronic paper of the present disclosure, for each pixel unit, after a voltage is applied to the first electrode and the second electrode, an electric field can be generated therebetween, and in this case, the charged particles (preferably the charged particles are black) in each pixel unit can be driven by the electric field to move; when the charged particles move to the surface of the microstructure, light from outside can be absorbed by the charged particles, and the pixel unit comes into a black state; and when the charged particles move away from the surface of the microstructure, since the refractive index of the material of the microstructure is greater than that of the air medium, light from outside can be subject to total internal reflection after being radiated to the microstructure through the first substrate, so that the pixel unit comes into a white state, thus achieving black and white display.

It can be understood that the above embodiments are only exemplary embodiments for illustrating the principle of the present disclosure; however, the present disclosure is not limited thereto. For those of ordinary skill in the art, various modifications and improvements can be made without departing from the spirit and essence of the present disclosure, and these modifications and improvements are also encompassed within the protection scope of the present disclosure.

What is claimed is:

1. A electronic paper, comprising:
   a first substrate provided with a microstructure and a plurality of first electrodes thereon;
   a second substrate arranged opposite to the first substrate and provided with a plurality of second electrodes thereon, wherein the microstructure is arranged on a side of the first substrate facing the second substrate; and
   pixel isolation walls arranged between the first substrate and the second substrate, for dividing the electronic paper into a plurality of pixel units,
   wherein each pixel unit comprises:
   one first electrode;
   one second electrode; and
   charged particles arranged between the first electrode and the second electrode,
   wherein: the first electrode and the second electrode control, depending on a voltage applied thereto, contact between the charged particles and the microstructure; when the charged particles are not in contact with the microstructure, light from outside is subject to total internal reflection after being radiated to the microstructure through the first substrate;
   the plurality of first electrodes are arranged on the side of the first substrate facing the second substrate: the plurality of second electrodes are arranged on a side of the second substrate facing the first substrate;
   the plurality of first electrodes are located between the first substrate and a layer where the microstructure is located;
   the first electrodes are located on a side of the microstructure facing the second substrate; and
   the first electrodes have a uniform thickness.

2. The electronic paper of claim 1, wherein a refractive index of a material of the microstructure is greater than 1.7.

3. The electronic paper of claim 1, wherein a shape of the microstructure comprises any of a hemisphere, a quadrangular pyramid and a circular cone.

4. The electronic paper of claim 1, wherein the charged particles are ink particles.

5. The electronic paper of claim 1, wherein the plurality of first electrodes are connected together to form a plate electrode.

6. The electronic paper of claim 1, wherein the plurality of second electrodes are connected together to form a plate electrode.

7. A manufacturing method of electronic paper, comprising:
   forming a plurality of first electrodes on a first substrate;
   forming a plurality of second electrodes on a second substrate;
   forming pixel isolation walls between the first substrate and the second substrate;
   providing charged particles between the first substrate and the second substrate; and
   performing cell alignment on the first substrate and the second substrate,
   wherein: the pixel isolation walls divide the electronic paper into a plurality of pixel units;
   each pixel unit comprises one first electrode, one second electrode, and charged particles arranged between the first electrode and the second electrode; and the manufacturing method of electronic paper further comprises
   forming a microstructure on a side of the first substrate facing the second substrate, wherein the first electrode and the second electrode in each of the pixel units control, depending on a voltage applied thereto, contact between the charged particles and the microstructure; when the charged particles are not in contact with the microstructure, light from outside is subject to total internal reflection after being radiated to the microstructure through the first substrate;
   on the side of the first substrate forming the microstructure on the first substrate further comprises:
   coating the first substrate with a transparent material; and
   forming the microstructure by nanoimprint process.

8. The manufacturing method of electronic paper of claim 7, wherein a thickness of the coated transparent material ranges from about 10 µm to about 50 µm.

9. The manufacturing method of electronic paper of claim 7, wherein providing the charged particles between the first substrate and the second substrate further comprises:
   dispersing the charged particles into a solvent to form a mixture, and filling the mixture into a space between the first substrate and the second substrate by instillation; and
   volatilizing the solvent, and introducing a gas.

10. The manufacturing method of electronic paper of claim 9, wherein the gas is air or an inert gas.

11. The manufacturing method of electronic paper of claim 9, wherein forming the plurality of first electrodes on the first substrate further comprises:

forming the plurality of first electrodes on a surface of a side of the first substrate facing the second substrate, and the step of forming the microstructure on the side of the first substrate facing the second substrate further comprises:

forming the microstructure on a side of the plurality of first electrodes facing the second substrate.

12. The manufacturing method of electronic paper of claim 9, wherein forming the microstructure on the side of the first substrate facing the second substrate further comprises:

forming the microstructure on a surface of a side of the plurality of first electrodes facing the second substrate, and the step of forming the plurality of first electrodes on the first substrate further comprises:

forming the plurality of first electrodes on a side of the microstructure facing the second substrate.

13. The manufacturing method of electronic paper of claim 12, wherein forming the plurality of first electrodes on the side of the microstructure facing the second substrate further comprises:

forming the plurality of first electrodes into a uniform thickness.

14. The manufacturing method of electronic paper of claim 7, wherein forming the plurality of first electrodes on the first substrate further comprises:

forming the plurality of first electrodes into an integral plate electrode.

15. The manufacturing method of electronic paper of claim 7, wherein forming the plurality of second electrodes on the second substrate further comprises:

forming the plurality of second electrodes into an integral plate electrode.

* * * * *